United States Patent [19]
Bruhnke et al.

[11] Patent Number: 4,899,612
[45] Date of Patent: Feb. 13, 1990

[54] COVER SLEEVE ARRANGEMENT FOR A VEHICLE STEERING COLUMN

[75] Inventors: Ulrich Bruhnke, Ehningen; Santiago Duenas, Rottweil; Helmut Fischer, Böblingen; Ferdinand Greiner, Aidlingen; Ingo Jobmann, Grafenau; Jürgen Körber, Sindelfingen; Siegfreid Nothacker, Weil Der Stadt; Jürgen Pfaffenbach, Hemmingen; Hans Trube, Herrenberg, all of Fed. Rep. of Germany

[73] Assignee: Diamler-Benz AG, Stuttgart, Fed. Rep. of Germany

[21] Appl. No.: 236,753

[22] Filed: Aug. 26, 1988

[30] Foreign Application Priority Data

Aug. 26, 1987 [DE] Fed. Rep. of Germany ....... 3728457

[51] Int. Cl.4 .............................................. B62D 1/18
[52] U.S. Cl. ......................................... 74/493; 74/18; 280/775; 277/DIG. 4
[58] Field of Search ................. 74/18, 18.1, 18.2, 493; 280/775; 277/DIG. 4

[56] References Cited

U.S. PATENT DOCUMENTS

| 2,549,925 | 4/1951 | Paton | 74/493 |
| 3,198,030 | 8/1965 | Miller et al. | 74/493 |
| 3,424,025 | 1/1969 | Harper | 74/493 |

FOREIGN PATENT DOCUMENTS

2922425 12/1980 Fed. Rep. of Germany ........ 74/493

*Primary Examiner*—Allan D. Herrmann
*Attorney, Agent, or Firm*—Barnes & Thornburg

[57] ABSTRACT

A cover sleeve for the protective covering of a clearance for the passage of a steering column of a motor vehicle through a dashboard is disclosed. To accommodate adjustment of the steering column as to its inclination and length, the cover sleeve is fastened by one end to the dashboard and by the other end to a steering column casing. The cover sleeve is braced between its fastening ends by a displaceable frame which is mounted on the casing and is acted upon in its direction of displacement by a resilient tensioning element.

12 Claims, 4 Drawing Sheets

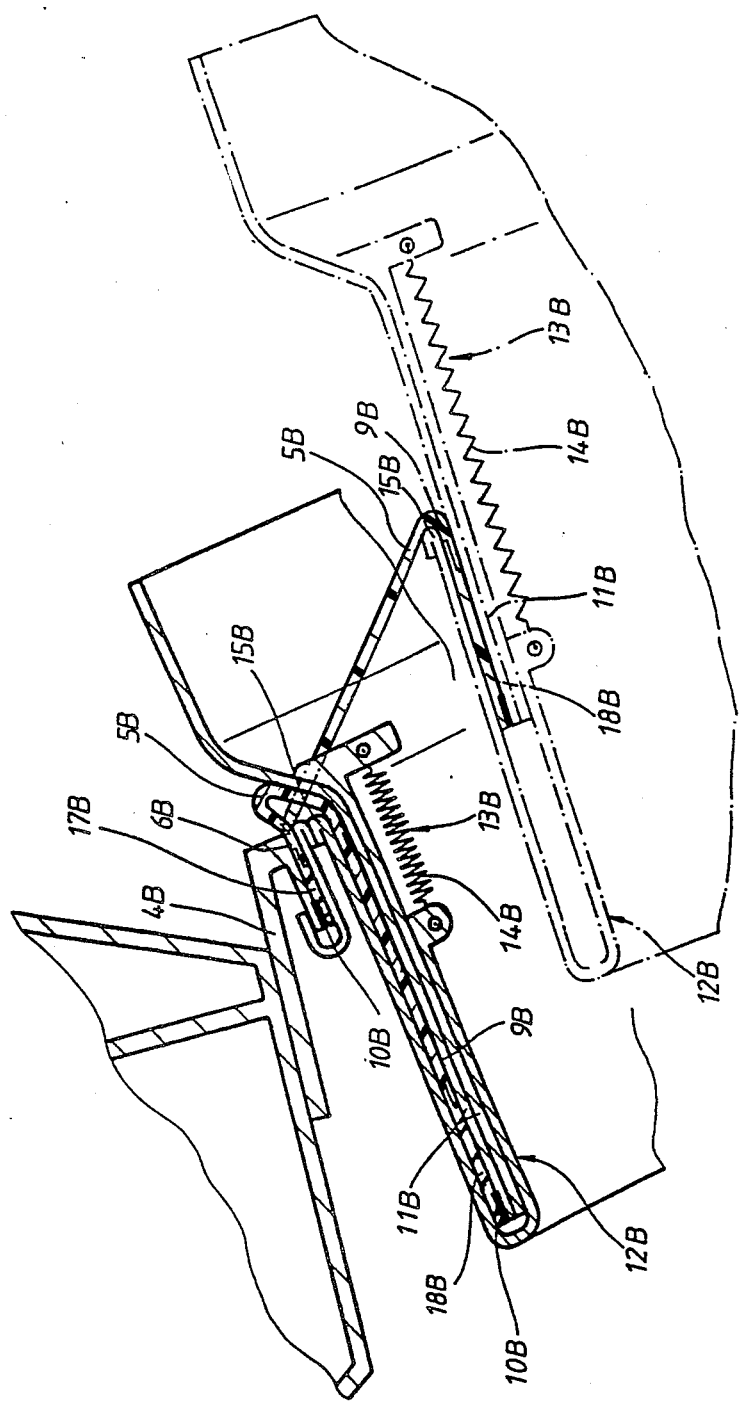

COVER SLEEVE ARRANGEMENT FOR A VEHICLE STEERING COLUMN

BACKGROUND AND SUMMARY OF THE INVENTION

The invention relates to a cover sleeve arrangement for the protective covering of a clearance for the passage of a steering column of a motor vehicle through a dashboard, adjustable as to inclination, the cover sleeve covering the clearance smoothly and in a sealing manner from the edge of the clearance up to a casing of the steering column and being configured to follow the movement of the steering column in the plane of the clearance.

German Patent Specification No. 2,922,425 describes a cover sleeve which serves to cover a clearance in a dashboard for the passage through the dashboard of a steering column which is adjustable as to inclination, the cover sleeve being disposed between the edge of the clearance and the steering column casing. This cover sleeve rests with its end on the casing side against the steering column casing and, when the latter is moved, follows its movement in the plane of the clearance, due to the effect of a tension spring. Such a sleeve design is not suitable for a steering column which can additionally be adjusted in length. The flexible cover sleeve is intended to seal off the clearance and, for this purpose, must be brought into flush contact with the casing. However, a longitudinal displacement of the casing, which would involve high transverse forces being introduced here into the cover sleeve, can lead to a disadvantageous deformation of the cover sleeve, as a result of which the sealing function would be put at risk and the overall visual impression would be impaired.

A cover bellows is known from U.S. Pat. No. 3,424,025, which covers a space between a handwheel, which has a through-hole for a steering column and clamps the latter, and a casing surrounding the steering shaft remote from the handwheel. This cover bellows forms a loop underneath the casing, as a result of which a longitudinal displacement of the steering shaft in the through-hole is possible. This cover bellows does not indicate any way of providing a protective covering for a clearance in a dashboard for a steering column adjustable as to its inclination.

An object of the invention is therefore to construct a cover sleeve arrangement of the above-noted general type which is able to be used for a steering column which is additionally adjustable in longitudinal direction, with an attractive appearance.

The object is achieved by an arrangement wherein the cover sleeve is fastened by its end on the clearance side to the rear of the dashboard and by its end on the casing side to the casing so as to be movable with the casing out of the plane of the clearance when there is a longitudinal adjustment of the steering column, and wherein a frame is mounted displaceably in the axial direction of the casing on the end of the casing remote from the steering wheel, behind the cover sleeve, on which frame resilient tensioning element means fixed to the casing can act in its direction of displacement and which frame is engageable against the rear of the cover sleeve by an edge fold and braces said cover sleeve between its fastening ends as soon as the cover sleeve presses onto the frame against the tensile force of the resilient tensioning element means.

Due to the fact that the cover sleeve is fastened to the rear of the dashboard and to the casing, no dirt can get into the clearance at the transition between these parts. Furthermore, the fastening has a muffling effect.

The cover sleeve allows large adjusting movements of the steering column and at the same time is always held by the frame in a tensioned braced position, consequently without significant folds.

Such a design even makes possible a covering of the clearance running around the casing.

According to certain preferred embodiments, it is contemplated on the one hand to design the edge fold of the frame in such a way that it can be brought up against the cover sleeve all the way around and to arrange for the resilient tensioning elements to act on the cover sleeve according to the tensioning points necessary for a braced position without significant folds, or alternatively to divide the frame around its periphery into several sections which can be adapted in their effect individually to the adjustment requirements.

In certain preferred embodiments, a flexible band which additionally acts compliantly on the end of the cover sleeve on the clearance side and alternatively also acts on the end of the cover sleeve on the casing side, leads to a particularly advantageous smoothing of the folds in the cover sleeve occurring during the steering column adjustment due to the shifting of the casing with respect to the edge of the clearance. The cover sleeve would have to absorb very different loads in partial regions of its fastening ends in the many possible steering column positions, which loads are now diverted into the flexible band and compensated by its extension.

Other objects, advantages and novel features of the present invention will become apparent from the following detailed description of the invention when considered in conjunction with the accompanying drawings.

BRIEF DESCRIPTION OF THE DRAWINGS

FIG. 2A is a partial schematic view taken in the direction of Arrow II of FIG. 2, depicting a modified embodiment with a multi-part frame;

FIG. 4 is a view similar to FIG. 2 showing yet another preferred embodiment with a cover sleeve which is fastened on both sides via a flexible band and is braced by a frame acted upon by a spiral spring.

DETAILED DESCRIPTION OF THE DRAWINGS

Figure 1:
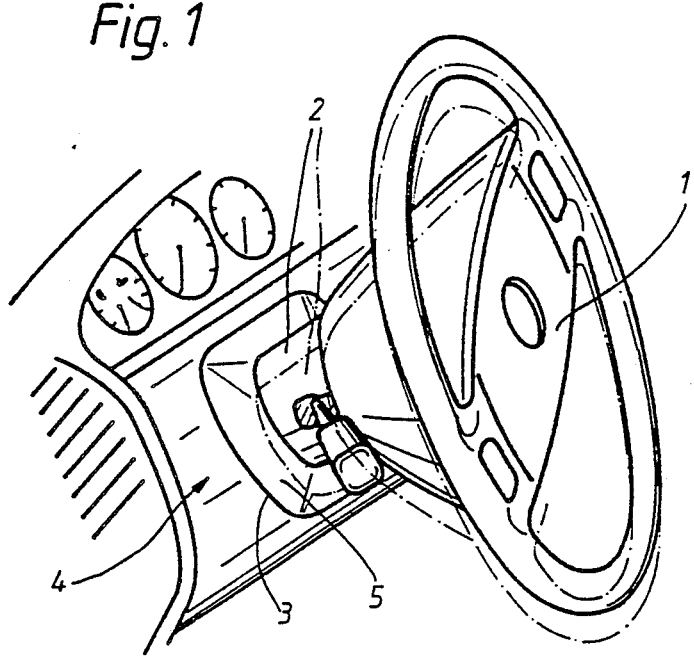
FIG. 1 is a partial perspective view of a portion of a vehicle showing a steering column arrangement with a cover sleeve constructed according to the invention, in an installed condition.

FIG. 1 shows a steering wheel 1 of a motor car, the steering column 2 of which passes through a clearance 3 of a dashboard 4, which clearance is large enough for an adjustment in the angle of inclination of the steering column 2 to be carried out unhindered, as represented here by dot-dashed lines. The clearance 3 is covered by a cover sleeve 5, which prevents the ingress of dirt into the space behind and makes for an attractive appearance.

Figure 2:
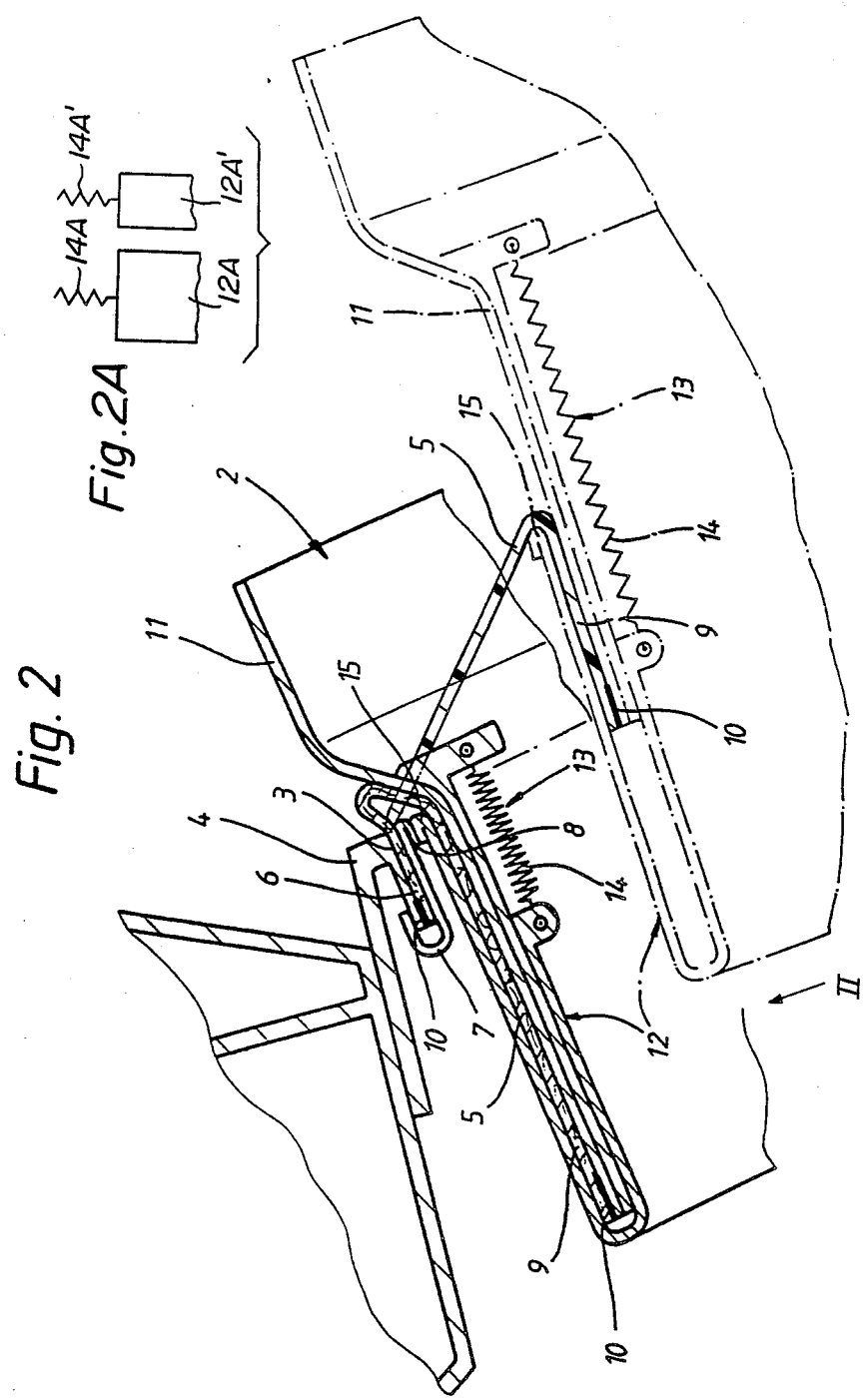
FIG. 2 is a partial schematic longitudinal sectional view showing a cover sleeve with frame acted upon by a spiral spring constructed in accordance with a preferred embodiment, and shown in two positions.

In FIG. 2, a longitudinal section through the arrangement in the region of the passage of the steering column 2 through the dashboard 4 is shown. The cover sleeve 5 is adhesively affixed by an end 6 on the clearance side to the rear of the dashboard 4, which cannot be seen from the passenger compartment of the vehicle, and is guided by a clip 7 up to the face edge of the dashboard 4, where the latter forms a rounded-off stop fold 8, around which the cover sleeve 5 can be wrapped.

With its opposite end 9, on the casing side, the cover sleeve 5 is likewise fastened via an adhesive joint 10 to a casing 11 of the steering column 2 so as to allow unhindered movement of the steering column 2 in an adjustment of the inclination and/or length and at the same time follow the movement of the casing 11. To be able to execute these movements, the cover sleeve 5 must be very pliant and also sufficiently large in area. Without additional tensioning of the surface, unsightly folds would then occur unchecked in various regions.

In order to prevent this, a frame 12 is mounted displaceably in the axial direction of the casing on the end of the casing 11 remote from the steering wheel. The frame 12 is connected to the casing 11 via a resilient tensioning element 13 behind the cover sleeve 5, tensioning element 13 is formed here by a spiral spring 14. If the position of the casing 11 is then changed within the clearance 3, as represented by dot-dashed lines, an edge fold 15 of the frame 12 comes into contact with the rear of the cover sleeve 5, after which, if there is further pressure of the cover sleeve 5 on the edge fold 15, the frame 12 pulls on the resilient tensioning element 13 and is in turn pressed by its stress in a bracing manner against the cover sleeve 5, which as a result lies stretched and without significant folds between its fastening ends 6 and 9.

The frame 12 here has an edge fold 15, which runs annularly around the casing 11 and is pressed against the cover sleeve 5 by two spiral springs 14 acting on opposite sides of the periphery of the frame 12.

Embodiments are also contemplated which are similar to FIG. 2 but with frame 12 subdivided around its periphery into several sections, which section would then act on the cover sleeve 5 independently of one another in the various steering column positions. FIG. 2A schematically depicts such embodiments with subdivided frame parts 12A, 12A' and corresponding separate spiral springs 14A, 14A'.

The cover sleeve 5 may also be fixed to the dashboard 4 and to the casing 11 by a clamped joint or by clips according to contemplated embodiments.

Figure 3:
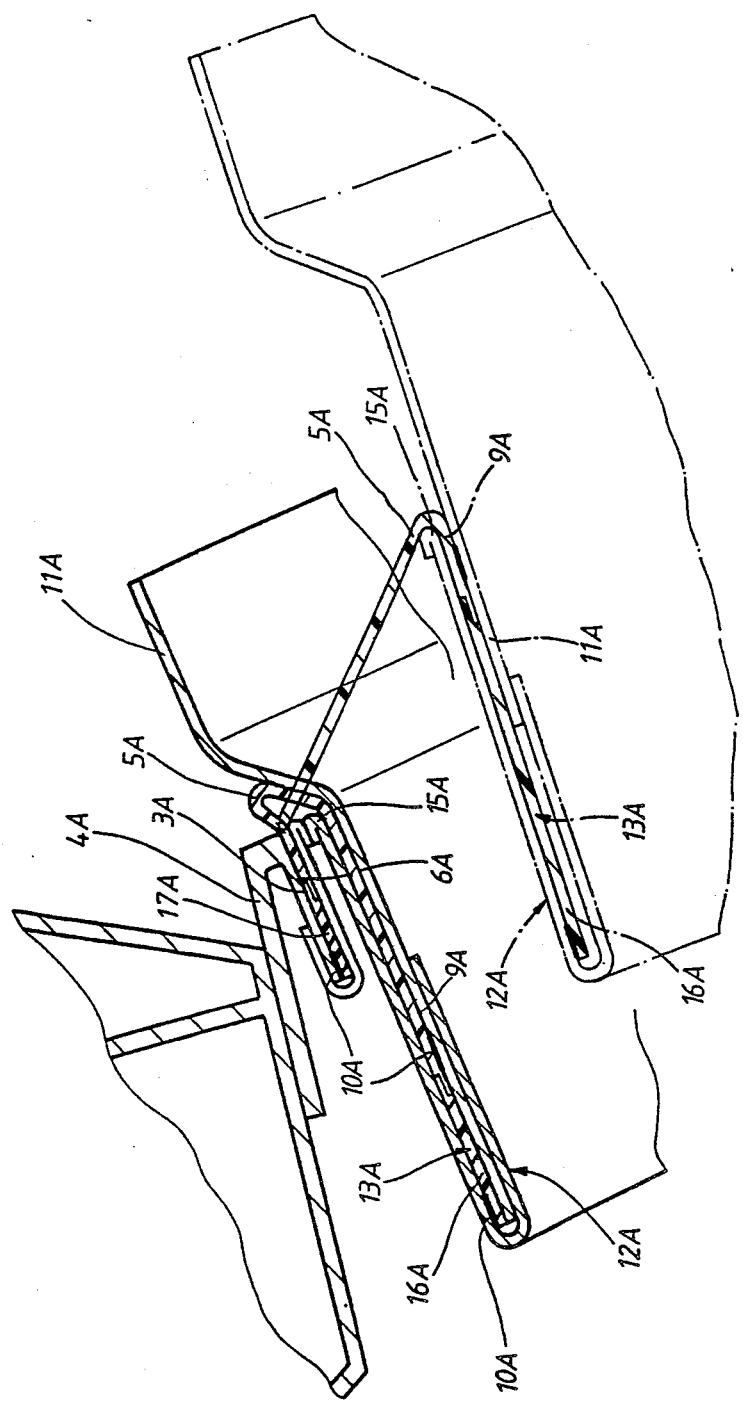
FIG. 3 is a view similar to FIG. 2 showing another preferred embodiment which has a flexible band as tensioning element.

FIG. 3 shows a cover sleeve 5A, at the end 9a of which, on the casing side, a flexible band 16A is sewn on, which is fastened to a frame 12A via an adhesive joint 10A. The end 9A of the cover sleeve 5A on the casing side is adhesively fixed directly to a casing 11A. As a result, the flexible band 16A acts as a resilient tensioning element 13A, by which, in a changed position of the casing 11A, shown in dot-dashed lines, an edge fold 15A of the frame 12A is pressed inside the clearance 3A against the rear of the cover sleeve 5A and thereby braces the latter between its fastening ends 6A and 9A.

In addition, this embodiment of FIG. 3 has a flexible band 17A sewn onto the end 6A of the cover sleeve 5A on the clearance side, via which band the cover sleeve can be fastened indirectly to the rear of a dashboard 4A.

By this flexible band 17A, the different tensile loads which act in individual regions of the sleeve in the various adjustment positions are compensated, so that the formation of folds in the cover sleeve 5A can be kept small by the compliance of the band 17A.

In FIG. 4, an advantageous Combination of the components for increasing the flexibility of a cover sleeve 5B is shown. A flexible band 17B and 18B is sewn on at both fastening ends 6B and 9B, via which band the cover sleeve 5B is fastened indirectly to the rear of a dashboard 4B and to a steering column casing 11B, respectively, by an adhesive joint 10B. A frame 12B, pressing onto the rear of the cover sleeve 5B in various positions of the casing 11B by an edge fold 15B, is connected to the casing 11B via a resilient tensioning element 13B, designed as a spiral spring 14B.

Due to this arrangement the cover sleeve 5B exhibits only a small formation of folds even in the lateral regions, where the casing 11B is displaced parallel to the line of the sleeve fastening during the inclination adjustment.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Cover sleeve arrangement for the protective covering of a clearance for the passage of a steering column of a motor vehicle through a dashboard, adjustable as to inclination, the cover sleeve covering the clearance smoothly and in a sealing manner from the edge of the clearance up to a casing of the steering column and being configured to follow the movement of the steering column in the plane of the clearance, wherein the cover sleeve is fastened by its end on the clearance side to the rear of the dashboard and by its end on the casing side to the casing so as to be movable with the casing out of the plane of the clearance when there is a longitudinal adjustment of the steering column, and wherein a frame is mounted displaceably in the axial direction of the casing on the end of the casing remote from the steering wheel, behind the cover sleeve, on which frame resilient tensioning element means fixed to the casing can act in its direction of displacement and which frame is engageable against the rear of the cover sleeve by an edge fold and braces said cover sleeve between its fastening ends as soon as the cover sleeve presses onto the frame against the tensile force of the resilient tensioning element means.

2. Cover sleeve arrangement according to claim 1, wherein the cover sleeve completely surrounds the casing in contact with it.

3. Cover sleeve arrangement according to claim 1, wherein the frame has an edge fold running around the casing lying close to the latter, and wherein the resilient tensioning element means acts on the frame at least in the direction of adjustment opposite the direction of inclination adjustment.

4. Cover sleeve arrangement according to claim 2, wherein the frame has an edge fold running around the casing lying close to the latter, and wherein the resilient tensioning element means acts on the frame at least in the direction of adjustment opposite the direction of inclination adjustment.

5. Cover sleeve arrangement according to claim 1, wherein the frame is divided around its periphery into several separate sections, which are displaceable independently of one another, and on which at least one resilient tensioning element of said resilient tensioning elements means acts in each case.

6. Cover sleeve arrangement according to claim 1, wherein the resilient tensioning element means includes spiral spring means.

7. Cover sleeve arrangement according to claim 3, wherein the resilient tensioning element means includes spiral spring means.

8. Cover sleeve arrangement according to claim 1, wherein the resilient tensioning element means includes a flexible band fastened to the end of the cover sleeve on the casing side.

9. Cover sleeve arrangement according to claim 3, wherein the resilient tensioning element means includes a flexible band fastened to the end of the cover sleeve on the casing side.

10. Cover sleeve arrangement according to claim 3, wherein the resilient tensioning element means includes a flexible band fastened to the end of the cover sleeve on the casing side.

11. Cover sleeve arrangement according to claim 1, wherein a flexible band is fixed to the end of the cover sleeve on the clearance side, which band indirectly fixes the said cover sleeve on the rear of the dashboard.

12. Cover sleeve arrangement according to claim 1, wherein end of the cover sleeve on the casing side is fastened to a flexible band and the latter is fastened to the casing.

* * * * *